July 7, 1959          A. J. GERACI          2,893,303

CAMERA MOUNT FOR STEREOSCOPIC PHOTOGRAPHY

Filed March 2, 1956          2 Sheets-Sheet 1

INVENTOR.
Anthony John Geraci,
BY Richards & Cifelli,
Attorneys

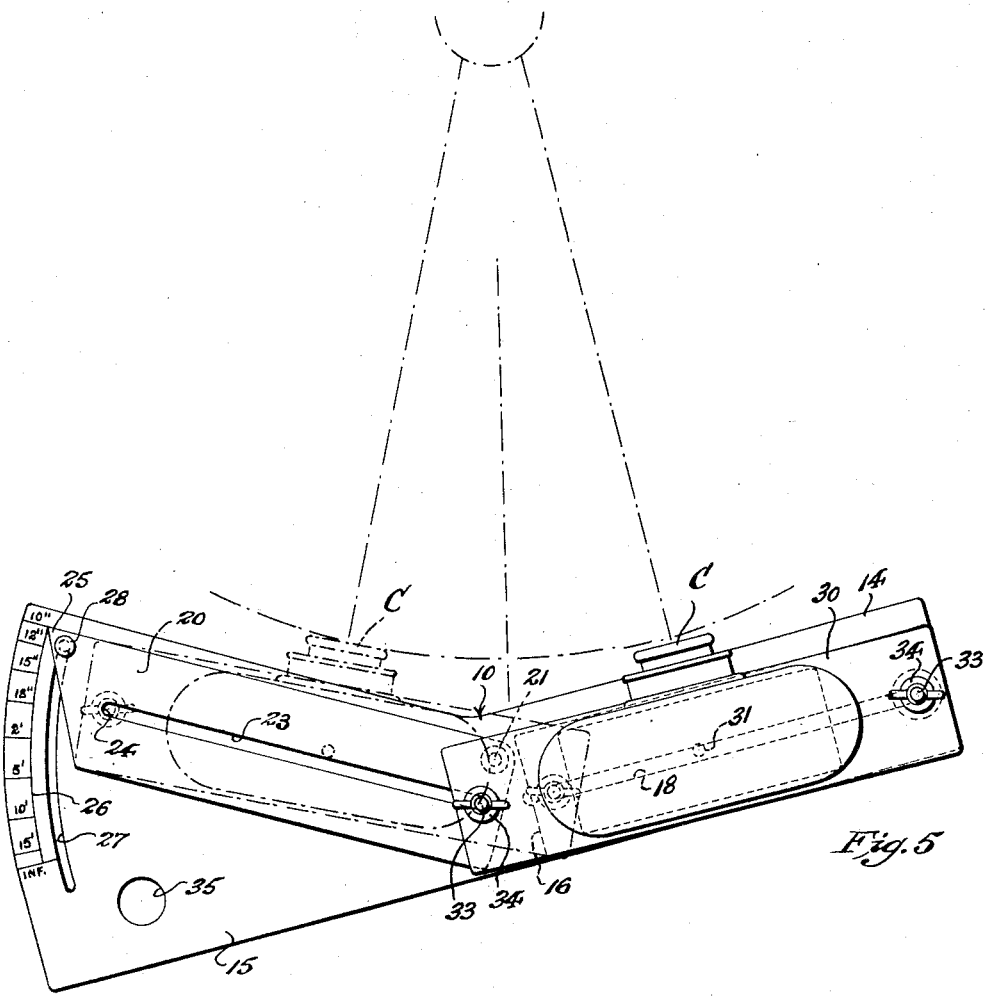
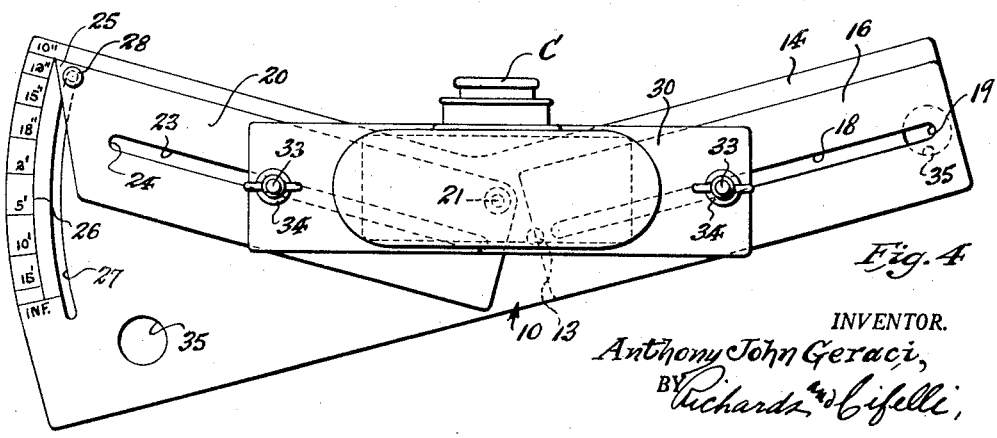

United States Patent Office 2,893,303
Patented July 7, 1959

2,893,303

CAMERA MOUNT FOR STEREOSCOPIC PHOTOGRAPHY

Anthony John Geraci, Newark, N.J.

Application March 2, 1956, Serial No. 569,117

4 Claims. (Cl. 95—86)

This invention relates to improved means for mounting a single lens camera subject to translational movement from one position to another determined by the extremes of an approximately interocular distance, whereby to obtain successive exposures for stereoscopic effect, especially with respect to the photography of objects within selected close-up or short focal distances.

The invention has for an object to provide a mechanically simple and easily manipulatable mount adapted to support a single lens camera in such manner that the camera can be quickly and easily focused upon an object to be photographed, and then, without disturbing its focused condition, be moved to a first position approximating one extreme of an interocular distance, in which position one exposure is made, and then moved in an arc, defined by a radius equal to the distance of the focused camera from the object to be photographed, from said first position to a second position, approximating the opposite extreme of said interocular distance, in which second position another exposure is made, whereby resultant photographs can be viewed in well known manner to attain a stereoscopic effect.

The invention has for another object to provide a single lens camera mount for stereoscopic photography which can be quickly and easily adjusted to support the camera for translational movement from one position to another through arcs defined by various selected radii corresponding to selected distances of the focused camera from the object to be photographed.

The invention has for a further object to provide a mechanically simple single lens camera mount, for the stated purposes, which comprises a base, a movable camera carriage, and carriage guide means supported by the base, said guide means being adjustable to selectively predetermine the arc of translational movement of the camera carriage from one exposure position to another.

Figure 1:
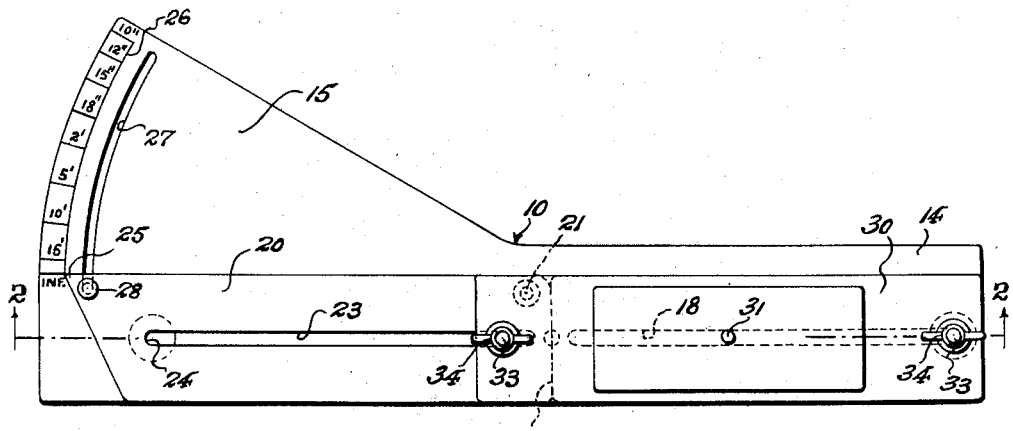
Figure 2:
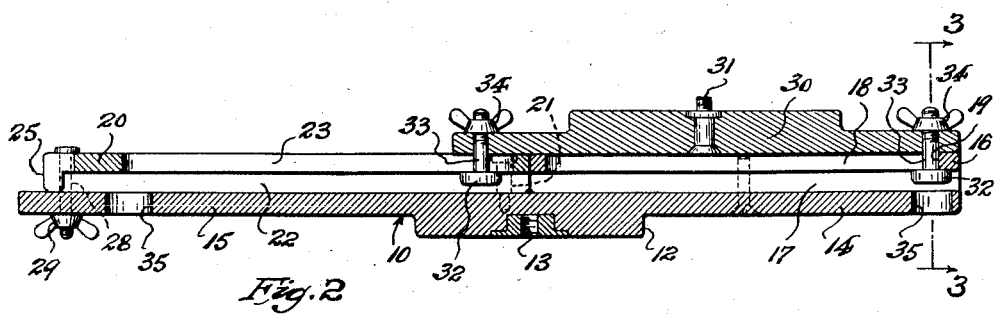
Figure 3:
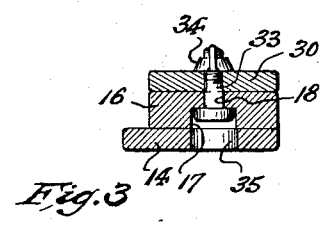

The above and other objects of this invention will become apparent from a reading of the following detailed description of an illustrative embodiment of this invention in connection with the accompanying drawings thereof, in which:

Fig. 1 is a top plan view of a camera mount according to this invention, the camera being omitted; Fig. 2 is a longitudinal sectional view of the same, taken on line 2—2 in Fig. 1; and Fig. 3 is a transverse vertical sectional view, taken on line 3—3 in Fig. 2.

Fig. 4 is a plan view of the camera mount showing a single lens camera operatively supported thereby, and positioned midway between extremes of an approximately interocular distance, in which position it may be conveniently focused upon an object to be photographed; and Fig. 5 is a similar view, showing, by full line delineation, the camera disposed on the mount in a first position for a first exposure, and, by broken line delineation, in a second position for a second exposure.

Referring to the drawings, in which like characters of reference indicate corresponding parts, the reference character 10 indicates the base of the camera mount, which is provided on its underside, and intermediate its oppositely extending end portions with a boss 12, in which is fixed a substantially centrally disposed, internally screw threaded socket 13, by means of which said base can be coupled to, for support by, a tripod (not shown). The base 10 however, in use, may be deposited upon, and suitably affixed to, any other convenient form of support. Said base 10 comprises an end section 14, and an oppositely extending sector shaped end section 15.

Fixed upon the upper face of the end section 14 of the base 10, either as an integral part thereof, or as a suitably attached part, is a stationary carriage guide member 16, the same being disposed in longitudinally aligned relation thereto, for extension from the approximate midpoint of the base 10 to the outer extremity of said end section 14 thereof. This stationary carriage guide member 16 is provided with an endwise open channel or runway 17, which extends longitudinally therethrough intermediate its top portion and the base end section 14. In alignment with said channel or runway 17, and in communication therewith, the top portion of the stationary carriage guide member 16 is provided with a longitudinal slot 18 of less width than said channel or runway 17. The ends of said slot 18 terminate short of the corresponding ends of the guide member 16, and the outer end provides a stop 19.

Supported upon the upper face of the oppositely extending end section 15 of the base 10 is a movable carriage guide member 20, the inner end of which is pivotally connected with the base member 10 by a pivot pin 21, whereby said guide member can be swung from a longitudinally aligned relation to the stationary carriage guide member 16 to a selected angular relation thereto, for purposes subsequently explained. This movable carriage guide member 20 is also provided, in its underside, with an endwise open channel or runway 22, which extends longitudinally therethrough beneath its top portion. In alignment with this channel or runway 22, and in communication therewith, the top portion of the movable carriage guide member 20 is provided with a longitudinal slot 23 of less width than said channel or runway 22. The ends of said slot 23 terminate short of the corresponding ends of the guide member 20, and the outer end provides a stop 24. The distance between the stop end 19 of the slot 18 of guide member 16 and the stop end 24 of the slot 23 of the guide member 20 is dimensioned to at least approximate an interocular distance, but may be spaced somewhat in excess of such distance. The free extremity of the guide member 20 is suitably shaped to provide a pointer formation 25, which cooperates with a suitably calibrated scale 26 that is provided on the marginal portion of the outer extremity of the base end section 15, for purposes hereinafter referred to. Said marginal portion of the outer extremity of the base end section 15 is provided with an arcuate slot 27, inwardly of and concentric to the scale 26. Carried by the free end portion of the movable guide member 20 is a lock bolt 28, which projects downwardly through said slot 27. On the free end of the lock bolt is a thumb nut 29 which can be tightened home against the base end section 15, whereby to releaseably clamp the movable guide member 20 to the base in a selected adjusted position to which it may be moved.

Supported upon the carriage guide members 16 and 20, in straddling relation to the adjoining inner end portions thereof and subject to sliding movement upon and along said guide members, is a camera carriage 30. Midway between its ends, the camera carriage 30 is provided with an upwardly projecting screw threaded coupling stud 31, by means of which a single lens camera C can be detachably affixed to the carriage for support and transport thereby. The carriage 30 is suitably coupled at its opposite ends with the respective carriage guide members 16 and 20, the respective coupling means riding in the channels or runways 17 and 22 and the guide slots 18 and 23 of said respective carriage guide members 16 and 20. An illustrative form of coupling means for such purpose, as shown, comprises headed guide bolts, the heads 32 of which respectively ride in the respective channels or runways 17 and 22 of said guide members 16 and 20, with their shanks 33 projecting upwardly through the overlying slots 18 and 23 to engage through the ends of the camera carriage 30. Thumb nuts 34 are engaged on said shanks 33 which, when tightened home against the camera carriage, serve to clamp the latter to the guide members 16 and 20 in selected positions thereon. To facilitate assembly of the headed guide bolts 32—33 with the carriage guide members 16 and 20 and their channels or runways 17 and 22 and guide slots 18 and 23, the base 10 may be provided with suitably located openings 35, through which the guide bolts can be passed to operative assembled relation to the carriage guide members, and to their coupling connections with the opposite end portions of the camera carriage 30.

In the use of the mount, a single lens camera C is fixed upon the carriage 30 by engaging the same with the coupling stud 31, whereupon the base 10 of the mount is attached to a tripod (not shown) or other suitable support, and leveled. The leveling may be determined by application to the mount of a spirit level (not shown) which, if desired, can be permanently attached thereto, in a convenient location.

Assuming that it is desired to obtain close-up photographs of an object which is spaced away from the camera a selected shot distance, e.g. a distance of ten inches. In such case, the movable carriage guide member 20 is swung outwardly, about its pivotal connection 21 with the base 10, to bring its pointer formation 25 into register with the ten inch indicating graduation of the scale 26, and is then locked to the base 10, in such position, by means of the lock bolt and thumb nut 28—29. This having been done, the camera carriage 30 is moved to a midpoint between the carriage guide members 16 and 20 which are straddled thereby, and then locked to the latter by turning home the thumb nuts 34 (see Fig. 4). The supported mount is then positioned so as to align the camera lens system with and in opposition to a midpoint of the object to be photographed, and spaced away from said object at the selected ten inch distance. The camera lens system is thereupon focused upon the object.

The camera being positioned relative to and focused upon the object to be photographed, the carriage 30 is released from its bound relation to the carriage guide member 16—20, and is then slid along the latter, e.g. to the right, until the shank 33 of the right hand guide bolt 32—33 is stopped against the outer stop end 19 of the slot 18 of the stationary guide member 16, in which position the carriage can again be locked to the guide members, and is thereby positioned at one extreme of an interocular distance. Such disposition of the carriage positions the camera C ready to be operated to take a first picture of a pair thereof required to obtain the desired stereoscopic effect (see full line showing of the carriage and camera in Fig. 5).

After the first picture is taken, the carriage is again released from its bound relation to the carriage guide members 16—20, and is then slid along the latter in the opposite direction, e.g. to the left, until the shank 33 of the left hand guide bolt 32—33 is stopped against the outer stop end 24 of the slot 23 of the guide member 20, in which position the carriage is again locked to said guide members at the opposite extreme of the interocular distance. Such disposition of the carriage positions the camera C ready to be operated to take the second picture of a pair thereof required to obtain the desired stereoscopic effect (see broken line showing of the carriage and camera in Fig. 5).

When the carriage guide members are set in a selected predetermined angular relation, their guide slots 18 and 23 diverge at a corresponding angle, and since opposite ends of the camera carriage 30 are guided by the divergent angularly extending guide slots 18 and 23, it will be obvious that the longitudinal axis of the camera carriage will, in all positions of the carriage, remain perpendicular to a radius of an arc of which the object to be photographed is the center, and consequently the lens system of the camera, in all positions of the camera, will be in alignment with a radius of said arc; in other words, when shifted from one position to another, the camera will traverse an arcuate path, and will be automatically obliquely shifted to maintain its lens system constantly directed toward the object to be photographed. Due to this, the camera, in both right and left positions thereof, will remain in its focused relation to the object, and can be shifted from one extreme to the other of an approximate interocular distance, without disturbance of its focused relation to the object. The camera lens system, when the camera is moved from one extreme position to another, will traverse an arc of a radius substantially equivalent in length to the selected distance of the camera from the object, and the camera will be automatically obliquely shifted to maintain its lens system constantly directed toward the object.

In the use of the camera for close-up exposures at comparatively short distances thereof from the object being photographed, especially for magnification effect, assured accuracy of focus can be obtained by focusing the camera lens system while the camera is disposed at a first exposure position, instead of in a central position as above described, and thereafter its focused condition will be undisturbed by movement of the camera to a second exposure position.

It will be understood that in manipulation of the carriage and camera, the same may be adjusted, at opposite positions thereof, somewhat short of the extremes of interocular distance, or somewhat beyond said extremes when the separation of the stop ends 19 and 24 of the carriage guide members exceeds such interocular distance, accordingly as picture planes of narrower or wider separation may be desired.

It will be understood that the angular relation of the camera carriage guide members may be varied from an initial longitudinally aligned relation (see Fig. 1) to desired divergently angular relations adapted to predetermine various arcs of camera movement having radii substantially corresponding in length to given distances of camera disposition relative to the object to be photographed, up to a selected minimum distance. The scale 26 can be suitably calibrated to indicate various angular positions of the movable carriage guide member 16 within such limits. When the carriage guide members are disposed in longitudinally aligned relation, pictures for stereoscopic effect can be taken of objectives located at infinite distance, by shifting the carriage and camera from one extreme of permitted movement to the other.

Inasmuch as changes may be made in the mount as illustratively disclosed by the drawings and the above description, without departing from the spirit and principles of this invention, it will be understood that the invention is not intended to be limited by said illustrative disclosure except as may be required by the scope of the herefollowing claims.

Having now described my invention, I claim:

1. A camera mount for stereoscopic photography comprising a base, a pair of camera guide members supported on the base in oppositely extending end to end relation in the same horizontal plane, and at least one of which is pivotally connected with the base so as to be adapted to be adjusted for selective divergent angular extension relative to the other, a camera carriage slidably supported on said guide members in bridging relation thereto for movement thereover through an approximate interocular distance, respective opposite ends of said carriage and the respective guide members having cooperative guide means adapted to direct and control endwise movement of said carriage upon the guide members, whereby a camera carried by said carriage in fixed non-pivotal attachment thereto is bodily movable along an arcuate path between extremes of the interocular distance, the radius of said path being determined by the selected degree of angular divergence of the guide members to conform in length to the distance at which the camera is spaced away from the object to be photographed, the base having means cooperative with the outer end of a pivoted guide member to indicate the selected adjusted relative angular disposition of the guide members in correspondance to the distance at which the camera is spaced away from the object to be photographed, and the outer end of said pivoted guide member and said base having cooperative means to releasably secure said pivoted guide member in selected angular relation to the other guide member.

2. A camera mount for stereoscopic photography comprising a base, a pair of camera guide members supported on the base in oppositely extending end to end relation in the same horizontal plane and at least one of which is pivotally connected with the base so as to be adapted to be adjusted for selective divergent angular extension relative to the other, a camera carriage slidably supported on said guide members in bridging relation thereto for movement thereover through an approximate interocular distance, respective opposite ends of said carriage and the respective guide members having cooperative guide means adapted to direct and control endwise movement of said carriage upon the guide members, whereby a camera carried by said carriage in fixed non-pivotal attachment thereto is bodily movable along an arcuate path between extremes of the interocular distance, the radius of said path being determined by the selected degree of angular divergence of the guide members to conform in length to the distance at which the camera is spaced away from the object to be photographed, said cooperative guide means comprising guide bolts, the guide members having longitudinally disposed slotted guideways by which said guide bolts are slidably supported, and said guide bolts being secured to the carriage end portions.

3. A camera mount for stereoscopic photography according to claim 2, wherein the base is provided with means cooperative with the outer end of a pivoted guide member to indicate the selected adjusted relative angular disposition of the guide members in correspondance to the distance at which the camera is spaced away from the object to be photographed, and said outer end of said pivoted guide member and said base having cooperative means to releasably secure said pivoted guide member in selected adjusted angular relation to said other guide member.

4. A camera mount for stereoscopic photography comprising a base, a pair of camera carriage guide members supported on said base in oppositely extending end to end relation in the same horizontal plane, one of said guide members being stationary relative to said base, means to pivotally connect the inner end of the other guide member to the base whereby it can be moved on the latter into selected divergent angular relation to the stationary guide member, a camera carriage slidably supported on said guide members in bridging relation thereto for movement thereover through an approximate interocular distance, respective opposite ends of said carriage and the respective guide members having cooperative guide means adapted to direct and control endwise movement of said carriage upon the guide members whereby a camera carried by the carriage, in fixed non-pivotal attachment thereto, is bodily movable along an arcuate path between extremes of the interocular distance, the radius of said path being determined by the selected degree of angular divergence of the guide members to conform in length to the distance at which the camera is spaced away from the object to be photographed, said cooperative guide means comprising guide bolts, the guide members having longitudinally disposed slotted guideways by which said guide bolts are slidably supported, and said guide bolts being secured to the carriage end portions, the base having means cooperative with the outer end of the pivoted guide member to indicate the selected adjusted angular relation of the latter relative to the stationary guide member in corresponding to the distance at which the camera is spaced away from the object to be photographed, and said outer end of the pivoted guide member and said base having cooperative means to releasably secure said pivoted guide member in selected angular disposition relative to the stationary guide member.

References Cited in the file of this patent

UNITED STATES PATENTS

| 2,400,455 | Donaldson | May 14, 1946 |
| 2,485,811 | Bonnet | Oct. 25, 1949 |
| 2,782,700 | Ianuzzi | Feb. 26, 1957 |